United States Patent
Massolle

(10) Patent No.: US 8,837,166 B2
(45) Date of Patent: Sep. 16, 2014

(54) VERTICALLY MOUNTED CAPACITOR ASSEMBLY

(75) Inventor: Dale W. Massolle, Davis Junction, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 279 days.

(21) Appl. No.: 13/284,175

(22) Filed: Oct. 28, 2011

(65) Prior Publication Data

US 2013/0107492 A1    May 2, 2013

(51) Int. Cl.
*H05K 7/02* (2006.01)
*H05K 7/04* (2006.01)
*H01G 4/38* (2006.01)
*H01G 2/06* (2006.01)
*H01G 9/26* (2006.01)

(52) U.S. Cl.
CPC . *H01G 9/26* (2013.01); *H01G 4/38* (2013.01); *H01G 2/06* (2013.01)
USPC .......................................... 361/807; 361/810

(58) Field of Classification Search
USPC ......................................... 361/807, 809, 810
See application file for complete search history.

(56) References Cited

U.S. PATENT DOCUMENTS

| | | | |
|---|---|---|---|
| 3,456,157 A | 7/1969 | Beemer | |
| 4,262,268 A * | 4/1981 | Shimada et al. | 333/182 |
| 5,895,293 A * | 4/1999 | Brandberg et al. | 439/620.09 |
| 5,959,831 A * | 9/1999 | Maeda et al. | 361/523 |
| 7,791,901 B2 * | 9/2010 | Sailor et al. | 361/807 |
| 8,427,836 B2 * | 4/2013 | Frank | 361/728 |
| 8,570,767 B2 * | 10/2013 | Schmit et al. | 361/821 |
| 2004/0251558 A1 | 12/2004 | Kida et al. | |
| 2009/0096418 A1 | 4/2009 | Abadia et al. | |

FOREIGN PATENT DOCUMENTS

| | | |
|---|---|---|
| EP | 1 589 547 A | 10/2005 |
| GB | 313 600 A | 2/1930 |
| JP | 57057531 | 7/1957 |
| JP | 54063259 A | 5/1979 |
| JP | 55141978 | 11/1980 |
| JP | 57095612 A | 6/1982 |
| JP | 2001283802 A | 10/2001 |
| JP | 2005199739 A | 7/2005 |
| JP | 2006318676 A | 11/2006 |
| JP | 2008204981 A | 9/2008 |

OTHER PUBLICATIONS

European Search Report, mailed Mar. 6, 2013.
Japanese Office Action for Japanese Patent Application No. 2012-236228.

* cited by examiner

*Primary Examiner* — Hung S Bui
(74) *Attorney, Agent, or Firm* — Kinney & Lange, P.A.

(57) ABSTRACT

A capacitor assembly comprises a plurality of capacitor elements, a clamping assembly, and a conductive path. The clamping assembly retains the plurality of capacitor elements longitudinally perpendicular to an adjacent mounting surface. The conductive path electrically connects the plurality of capacitor elements to one or more circuit elements disposed proximate the adjacent mounting surface.

14 Claims, 7 Drawing Sheets

VERTICALLY MOUNTED CAPACITOR ASSEMBLY

BACKGROUND

The invention relates generally to mounting electronic components, and more specifically to methods and apparatus for mounting capacitors.

Capacitors mounted to circuit boards and printed wire boards are usually oriented longitudinally parallel to the board to maximize contact area and minimize the length of leads. However, in many cases, the board surface area and longtitudinal length may limit the number of capacitors that can be included, restricting the amount of capacitive storage available for certain space-restricted applications. In some applications, radial lead capacitors can be used and oriented longitudinally perpendicular to the board. However, the internal geometry of radial lead capacitors is more complex, with many high-power capacitors such as electrolytic tantalum capacitors not readily adaptable to such a design.

Complicating the issue are high power density axial- and radial-lead capacitors, with weight, vibration, and heat that can weaken or fracture the leads. Mounting capacitors vertically without a support or other mounting structure actually increases these problems compared to other types of mounting. Operational torsion and heat can cause damage to the connections, the capacitor structure, and the board itself.

SUMMARY

A capacitor assembly comprises a plurality of capacitor elements, a clamping assembly, and a conductive path. The clamping assembly retains the plurality of capacitor elements longitudinally perpendicular to a mounting surface. The conductive path electrically connects the plurality of capacitor elements to one or more circuit elements disposed proximate the mounting surface.

A capacitor clamping assembly comprises an upper electrically insulating section, a lower electrically insulating section, and a conductive path. A combination of the upper section and the lower section defines a cylinder having a plurality of internal recesses disposed circumferentially around the cylinder for retaining a corresponding plurality of capacitor elements longitudinally perpendicular to a mounting surface. The conductive path is provided for electrically connecting the plurality of capacitor elements to at least one electrical circuit element disposed proximate the mounting surface.

A capacitor clamping assembly comprises a mounting base, a central strut, and a plurality of peripheral struts arranged circumferentially around the central strut. The struts project perpendicularly from the mounting base. Combination of the central strut and the plurality of peripeheral struts define a plurality of recesses therebetween for retaining a corresponding plurality of capacitor elements circumferentially around the central strut in a vertical orientation and perpendicular to a mounting surface.

DETAILED DESCRIPTION

Figure 1A:
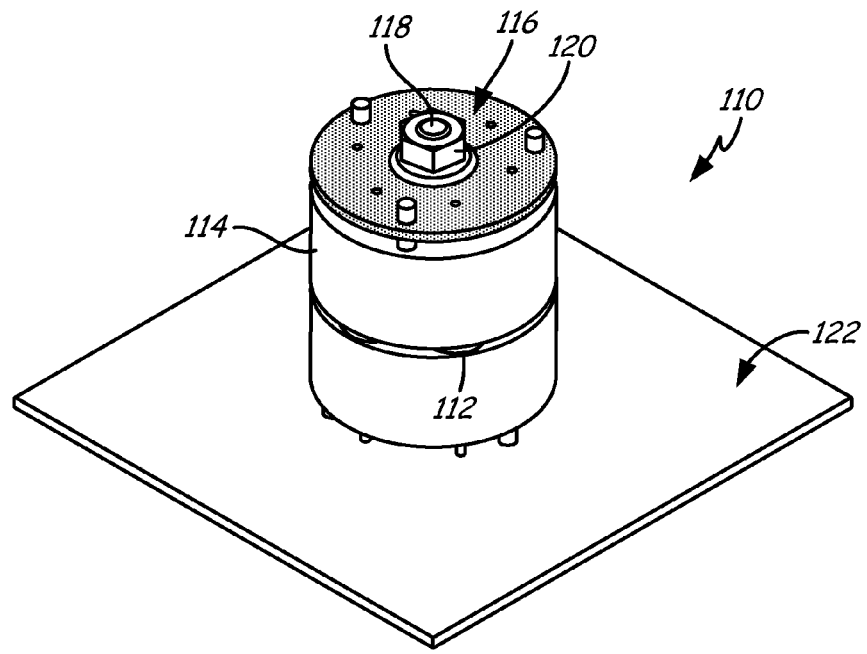
FIG. 1A is an isometric view of a first example capacitor assembly with elements mounted perpendicular to a wiring board.

FIG. 1A shows capacitor assembly 110, capacitor elements 112, clamping assembly 114, solder plate 116, mounting bolt 118, mounting nut 120, and printed wire board assembly (PWBA) 122.

In this first example embodiment, capacitor assembly 110 includes capacitor elements 112 retained vertically within clamping assembly 114. In this and other example embodiments, capacitor elements 112 are oriented vertically, or perpendicular to an operative mounting surface of a circuit board, here PWBA 122. As will be seen in more detail in FIGS. 1B and 1C, capacitor elements 112 are electrically linked to the circuit(s) on PWBA 122 directly through positive leads disposed beneath capacitor assembly 110, and indirectly through capacitor clamping assembly 114. In this and other embodiments described in subsequent figures, the clamping assembly includes a shaded conductive path to incorporate the capacitor elements to the circuit.

PWBA 122 and its equivalents include a plurality of wiring and circuit elements for power electronics, system control, or other applications. In this and all of the following examples, it will be understood that appropriate mounting and solder points and other circuitry are provided to join the capacitors to a particular circuit(s) on the PWBA. PWBA wiring will vary based on each particular application and thus has been omitted for reasons of clarity from the examples provided herein.

Figure 1B:
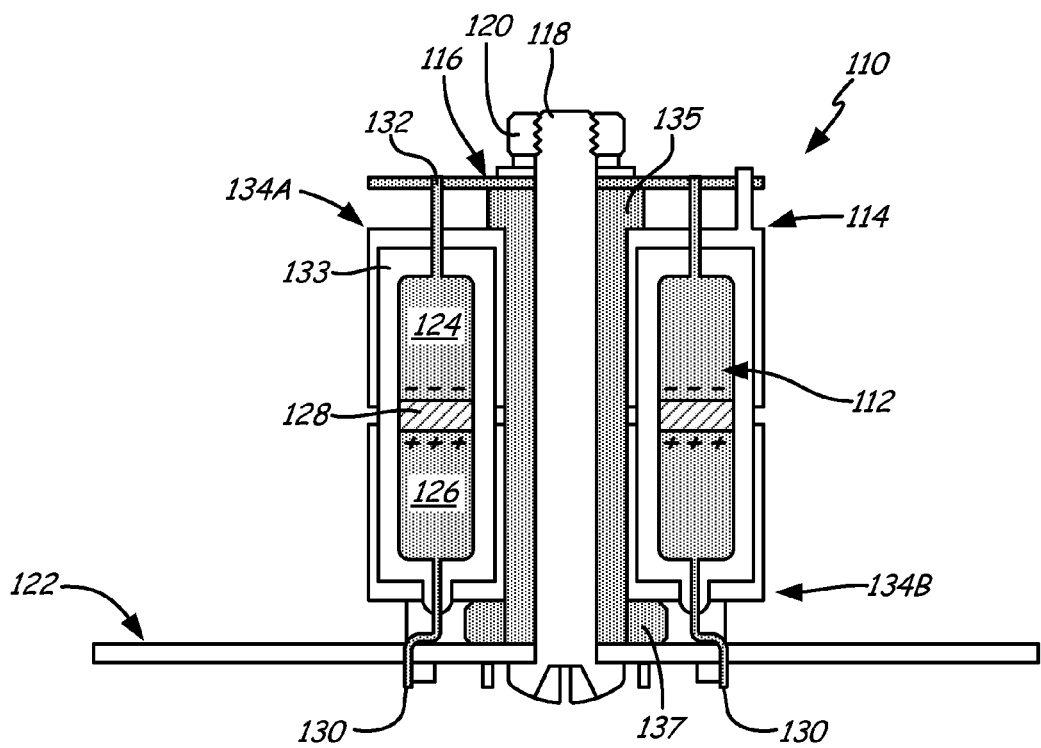
FIG. 1B is a sectional view of the first example capacitor assembly.

FIG. 1B shows capacitor assembly 110, capacitor elements 112, clamping assembly 114, solder plate 116, mounting bolt 118, mounting nut 120, printed wire board assembly (PWBA) 122, cathodes 124, anodes 126, dielectrics 128, positive leads 130, negative leads 132, capacitor insulators 133, upper clamp section 134A, lower clamp section 134B, central conductor 135, and conductive nut 137.

FIG. 1B is a sectional view of assembly 110 from FIG. 1A. Capacitor assembly 110 is secured to PWBA 122 by mounting screw 118 and nut 120. Capacitor elements 112 are axial lead capacitors substantially disposed longitudinally perpendicular to PWBA 122 and respectively include cathode 124 and anode 126 with dielectric 128. Connection is made via respective cathode (negative) leads 132 and anode (positive) leads 130. In this and other examples, clamping assembly 114 generally orients first positive leads 130 generally toward the mounting surface (PWBA 122) and second distal negative leads 132 away from the mounting surface. Leads 130, 132 are electrically linked to a conductive path component of clamping assembly 114, directly or indirectly joining capacitors 112 to electrical circuit(s) on PWBA 122.

In the example embodiments described herein, capacitor elements 112 are known as tantalum capacitors, available commercially from numerous vendors. Anode 126 is tantalum with a dielectric 128 layer of tantalum oxide. Solid tantalum capacitors can have a manganese oxide cathode 124. Except for leads 130, 132, cathode 124 and anode 126 are encapsulated in insulator 133 which can be an electrically insulating and thermally conductive epoxy or a urethane. Tantalum oxide dielectric 128 has a very high dielectric constant, allowing a very thin dielectric layer and is thus one of the highest power capacitors. Additionally, in this example, leads 130, 132 are a copper alloy such as brass (e.g., UNS C36000, C46400, or C26000), or tellurium copper (e.g., UNS C14500). This combination of structural and electronic materials also aids in rejecting heat from capacitor elements 112 while maximizing electrical performance.

Capacitor mounting assembly 114 includes solder plate 116, upper and lower clamp sections 134A, 134B, center conductive sleeve 135, and conductive nut 137. To facilitate current flow, positive terminals 130 can be soldered or otherwise electrically connected to solder plate 116 and to PWBA 122. Solder plate 116 is conductive and electrically joins cathodes 124 via negative leads 130. In conjunction with nut 137 and center conductive sleeve 135 disposed through the center of clamp sections 134A, 134B, solder plate 116 provide an electrical current path through mounting assembly 114. As also seen in FIG. 1B, negative charge accumulates in cathodes 124 and a positive charge accumulates in anodes 126 to maintain an electrical potential across dielectrics 128. The conductive current path, including cathode 124 and anode 126, is shaded for illustrative purposes. Dielectric 128 is differentially shaded from the conductive path.

Clamping assembly 114 (and related alternative embodiments below) reacts forces caused by vibrational and torsional stresses to ensure continued connection of capacitor assembly 110. These stresses are characteristic of operational stresses experienced by these and other high-power capacitors 112. Electrolytic tantalum capacitors are frequently used in space and military applications in power electronics to maintain operation through virtually any environment. Vertical mounting of these and other capacitors can reduce board area compared to longitudinal mounting. The mass and large profile of these and other high-power capacitors in a vertical mounting arrangement exacerbate stresses in and around the capacitor elements, which can cause the leads to prematurely wear or fracture.

Positive leads 130 are soldered or otherwise electrically connected to PWBA 122 beneath capacitor assembly 110. Capacitor mounting assembly includes ports or other pathways in the base (shown in FIG. 1C) for leads 130 to extend therethrough. Capacitor assembly 114 allows vertical mounting of elements 112, putting the smaller form factor of the capacitor elements onto the board. In addition, leads 130 can be stored under the capacitor assembly rather than taking up even more board space as compared to traditional mounting of axial-lead capacitors. In this example, positive leads 130 are bent or folded to provide slack to accommodate thermal expansion from resistance heating. Folding also accommodates high vibration and torsional stress which may also be present depending on the operating environment. Alternatively, in other embodiments, leads project straight from the capacitor elements and the clamping assembly includes another conductive structure to resist stresses.

Figures 1C, 1D:
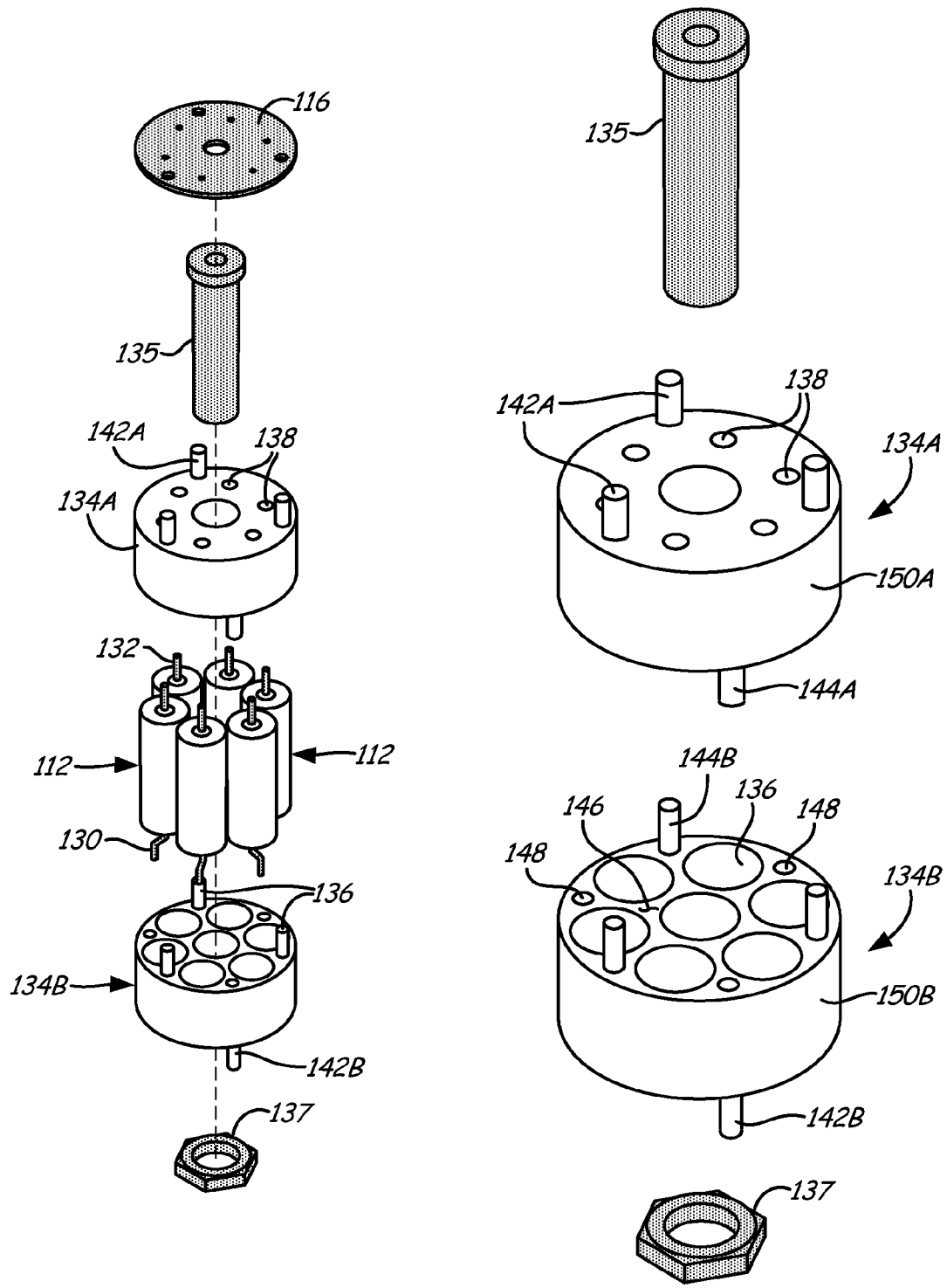
FIG. 1C is an exploded view of the first example capacitor clamping assembly.
FIG. 1D shows details of the first example vertical clamping assembly.

FIG. 1C shows capacitor elements 112, clamping assembly 114, positive leads 130, negative leads 132, solder plate 116, upper clamp section 134A, lower clamp section 134B, center conductive sleeve 135, recesses 136, conductive nut 137, lead pathways 138, outer pins 142A, 142B, and inner pins 144A, 144B.

FIG. 1C is an exploded view showing capacitor elements 112 and the various components of clamping assembly 114. Respective upper and lower clamp sections 134A, 134B together substantially form a cylinder with recesses 136 for capacitor elements 112. Each recess 136 has a pathway 138 for negative and positive leads 130, 132 to protrude therethrough for connection to the conductive path. Positive leads 132 can be soldered or otherwise secured directly to PWBA 122 as shown in FIG. 1B. Negative leads 130 are soldered or secured to solder plate 116. In conjunction with center conductive sleeve 135 and nut 137, solder plate 116 forms part of the conductive path linking capacitors 112 with PWBA 122. Clamping sections 134A, 134B can be epoxy or other electrically insulating resin to isolate the conductive path.

As described with respect to FIG. 1B, vertical mounting of capacitor elements 112 saves a substantial amount of mounting area on PWBA 122, but also can increase vibration and torsional forces that could damage or fracture leads 130. Thus, in addition to bending or folding leads 130, clamp sections 134A, 134B can include outer pins 142A, 142B and inner pins 144A, 144B to axially stiffen assembly 110 to mitigate effects of these stresses as shown in FIG. 1D.

FIG. 1D shows clamping assembly 114, upper clamp section 134A, lower clamp section 134B, center conductive sleeve 135, recesses 136, conductive 137, lead pathways 138, outer pins 142A, 142B, inner pins 144A, 144B, central cylinder portion 146, peripheral strut portions 148, and outer cylinder surfaces 150A, 150B.

In addition to recesses 136 and lead pathways 138 for capacitor elements 112 (shown in FIGS. 1A-1C), upper and lower clamp sections 134A, 134B each have respective outer pins 142A, 142B, projecting above and below assembly 114. Clamp sections 134A, 134B also each include at least one inner pin 144A, 144B projecting toward the opposing clamp section. Together these provide axial stiffness to clamping assembly 114 which minimizes torsional forces of one element relative to another. As seen in FIG. 1C, outer pins 142A also project through conductive solder plate 116 (shown in FIG. 1C) and outer pins 142B project through holes in PWBA 122. In combination with inner pins 144A, 144B, this minimizes the effects of torsional and vibrational stresses including stresses on positive leads 130 (shown in FIGS. 1B and 1C). In alternative embodiments, depending on the anticipated or actual operational forces, any or all of pins 142A, 142B, 144A, 144B may be added, moved, or omitted.

In this case, upper section 134A is an inverted instance of lower section 134B and vice versa. Together, sections 134A, 134B substantially define a cylinder with central portion 146, vertical strut portions 148, and outer portions 150 linking outer parts of strut portions 148. Clamp sections 134A, 134B, including outer pins 142A, 142B and inner pins 144A, 144B are electrically insulating to prevent short circuits. These sections can be epoxy- or urethane-based which will also aid in heat rejection. The examples showing this and other embodiments depict a small gap between sections 134A, 134B, even when assembly 110 is mounted to PWBA 122 (shown in FIGS. 1A and 1B). This is primarily for illustrative purposes and any gap is exaggerated to better show the two separate sections 134A, 134B and the relative orientation of capacitor elements 112. Sections 134A, 134B can alternatively fit tightly, defining a cylinder without a gap therebetween. Several other variations on capacitor assembly 110 with vertically oriented capacitor elements are shown in the remaining figures.

Figure 2A:
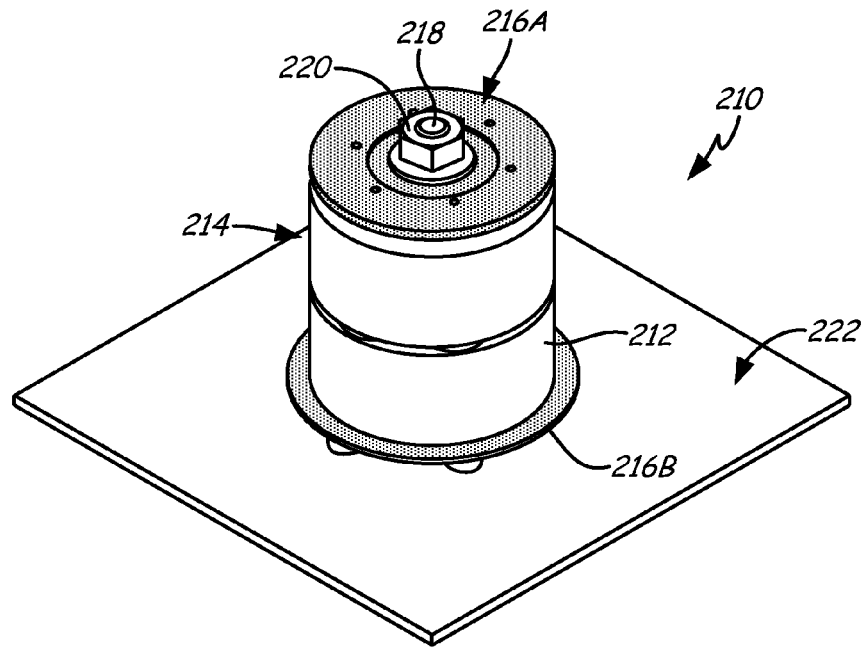
FIG. 2A is an isometric view of a second example capacitor assembly with elements mounted perpendicular to a wiring board.

FIG. 2A shows a second example embodiment with capacitor assembly 210, capacitor elements 212, clamping assembly 214, upper conductive solder plate 216A, lower mounting solder plate 216B, mounting bolt 218, mounting nut 220, and PWBA 222.

In this second example embodiment, capacitor assembly 210 includes capacitor elements 212 retained by clamping assembly 214. Capacitors 212 are secured between upper and lower solder plates 216A, 216B with axial mounting bolt 218 and nut 220.

Figure 2B:
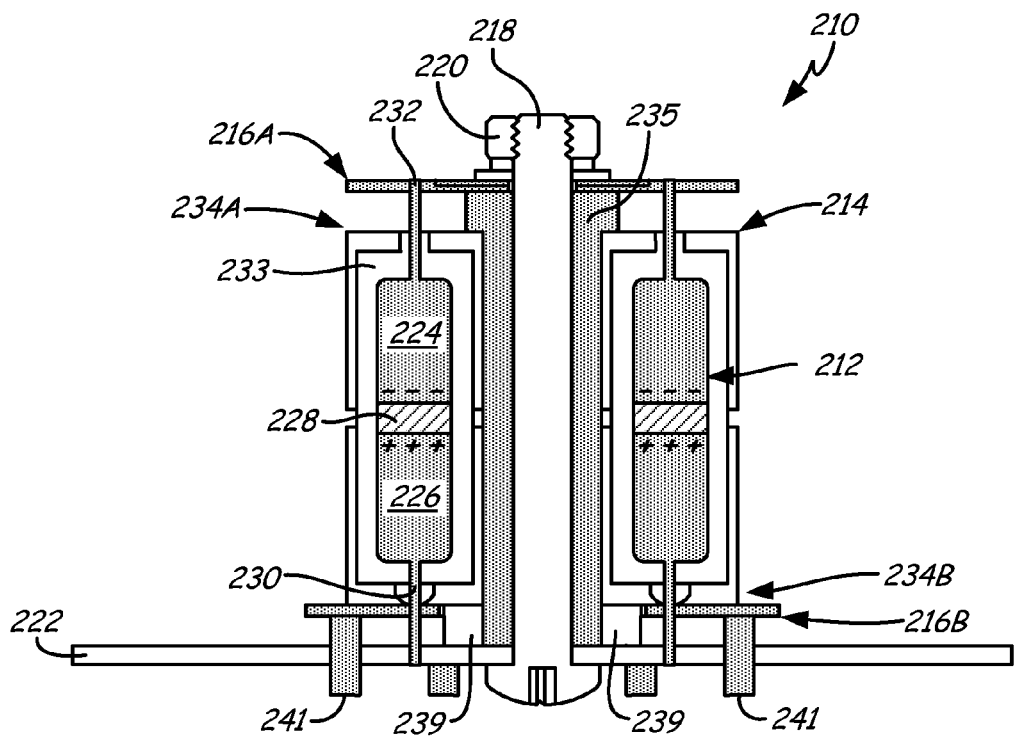
FIG. 2B is a sectional view of the second example capacitor assembly.

FIG. 2B is a sectional view of FIG. 2A showing capacitor assembly 210, capacitor elements 212, clamping assembly 214, upper conductive solder plate 216A, lower mounting solder plate 216B, mounting bolt 218, mounting nut 220, PWBA 222, cathodes 224, anodes 226, dielectrics 228, positive leads 230, negative leads 232, capacitor insulators 233, upper clamp section 234A, lower clamp section 234B, center conductive sleeve 235, insulating nut 239, and conductive pins 241.

Like FIGS. 1A-1C, capacitor elements 212 each include respective cathode 224 and anode 226 with dielectric 228 disposed therebetween. These elements are surrounded by electrical insulator 233 which isolates the electrical elements from the surrounding environment. In this and the other examples, capacitor elements 212 are the same tungsten-based capacitors as described with respect to FIGS. 1A-1C.

Clamping assembly 214 includes upper section 234A and lower portion 234B and a conductive path (shaded) with upper solder plate 216A, lower solder plate 216B, and center conductive sleeve 235. Upper solder plate 216A and solder plate 216B are electrically conductive to provide a conductive path through clamping assembly 214 for electrically connecting capacitors 212 to PWBA 222. Upper plate 216A is electrically connected to center conductive sleeve 235 to provide a conductive path to distal second (negative) leads 232 soldered thereto. First (positive) leads 230 project through and are soldered to lower solder plate 216B. The conductive path through capacitor assembly 210 is completed by connecting anodes 226 to lower solder plate 216B via positive leads 230. Plate 216B includes conductive pins 241 soldered to PWBA 222, which provides most or all of the electrical connection between anode 226 and circuit(s) disposed on PWBA 222. Positive leads 230 may or may not also be soldered to PWBA 222, depending on the electrical requirements of the particular circuit(s) for which capacitor assembly 210 is being used.

Insulating nut 239 isolates sleeve 236 from lower solder plate 216B and positive leads 230. Insulating nut 239 threads to the end of sleeve 235, isolating it from lower solder plate 216B and positive leads 230. Together sleeve 235 and nut 239 secure capacitors 212 within clamping assemblies 234A, 234B. Positive leads 230 need not be bent to withstand torsional and vibrational stresses because plate 216B provides both a conductive path and axial stiffness through conductive pins 241.

Figure 2C:
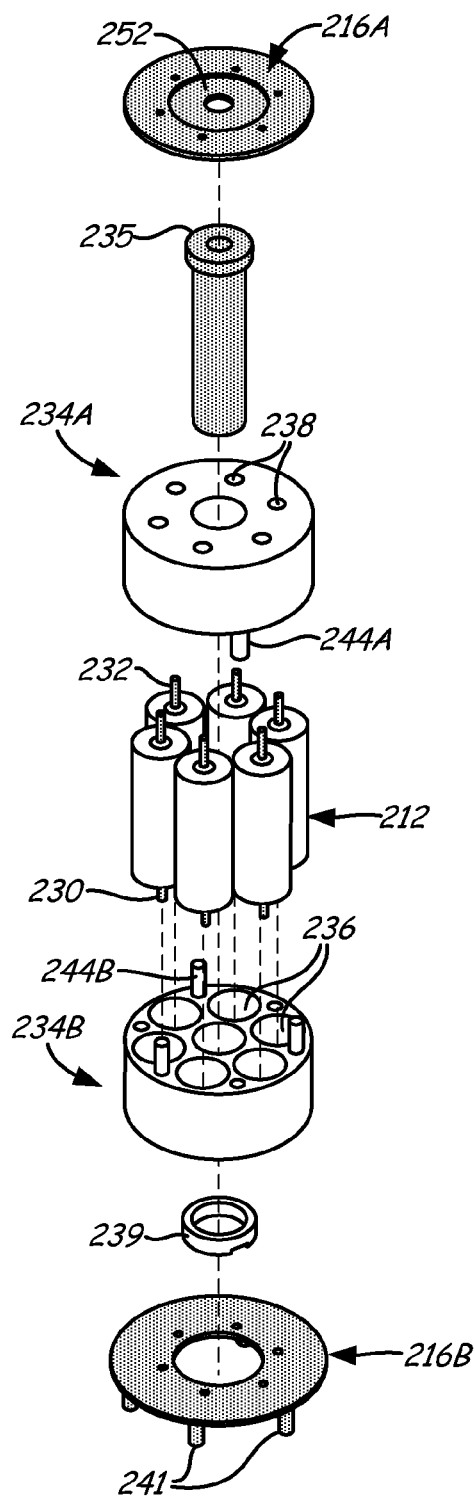
FIG. 2C is an exploded view of the second example capacitor clamping assembly.

FIG. 2C shows capacitor elements 212, clamping assembly 214, upper solder plate 216A, lower solder plate 216B, PWBA 222, positive leads 230, negative leads 232, upper clamp section 234A, lower clamp section 234B, center conductive sleeve 235, clamp recesses 236, lead pathways 238, insulating nut 239, conductive pins 241, inner pins 244A, 244B, and upper solder plate recess 252.

FIG. 2C is an exploded view of clamping assembly 214 with receiving sections 236 and lead pathways 238 for retaining and orienting six capacitor elements 212 perpendicular to PWBA 222. It will be appreciated that capacitor elements having different dimensions (cross-section and/or height) may result in modifying the arrangement of clamping assembly 214 with the goal of minimizing vibration and/or board area.

Upper solder plate 216A includes annular solder plate groove 252 for plate 216A to radially expand and contract. Solder plate 216A and the elements therearound are prone to thermal expansion. Solder plate recess 252 reduces stress and breakage of negative leads 232 by providing room for expansion of various elements of the assembly. Lower solder plate 216B also includes a larger center aperture for receiving insulating nut 239 which electrically isolates center conductive sleeve 235. Nut 239 can be produced, for example, using a phenolic resin or other material with suitable electrically insulating and thermally conductive properties.

Figure 3A:
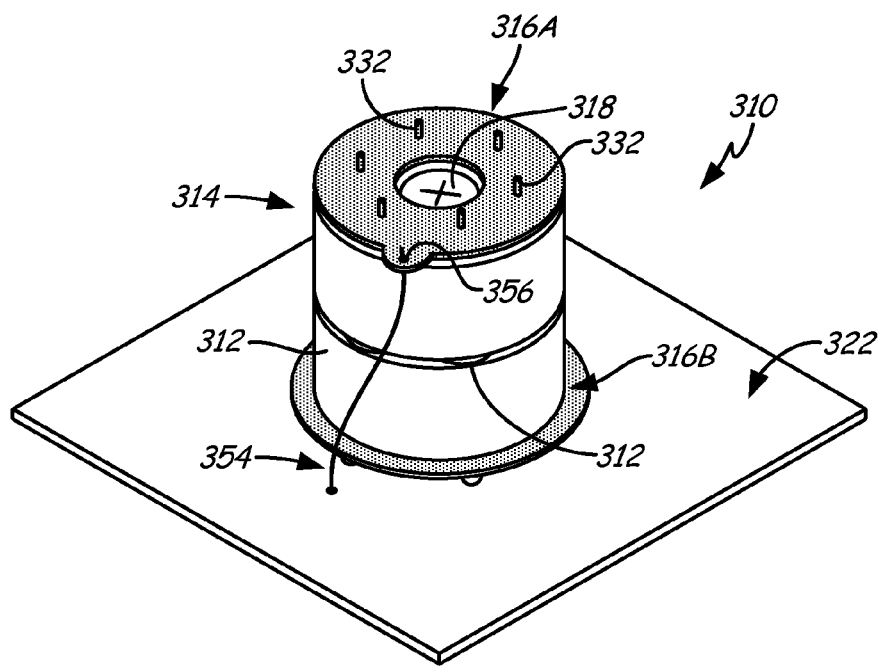
FIG. 3A is an isometric view of a third example capacitor assembly with elements mounted perpendicular to a wiring board.

FIG. 3A is a third example embodiment showing capacitor assembly 310, capacitor elements 312, clamping assembly 314, upper solder plate 316A, lower solder plate 316B, mounting screw 318, PWBA 322, cathode terminals 332, outer lead 354, and outer lead guide 356.

Capacitor assembly 310 operates similarly to assembly 210. However, outer lead 354 is provided to conduct current and complete the conductive path in lieu of a conductive sleeve through the center of the clamping assembly. Outer lead 354 connects outer lead guide 356 on solder plate 316A with PWBA 322. Outer lead 354 can be a single wire up to negative leads 332. Capacitor assembly 310 is mounted using a downward oriented mounting bolt or screw 318, with nut 320 securing the assembly beneath PWBA 322.

Figure 3B:
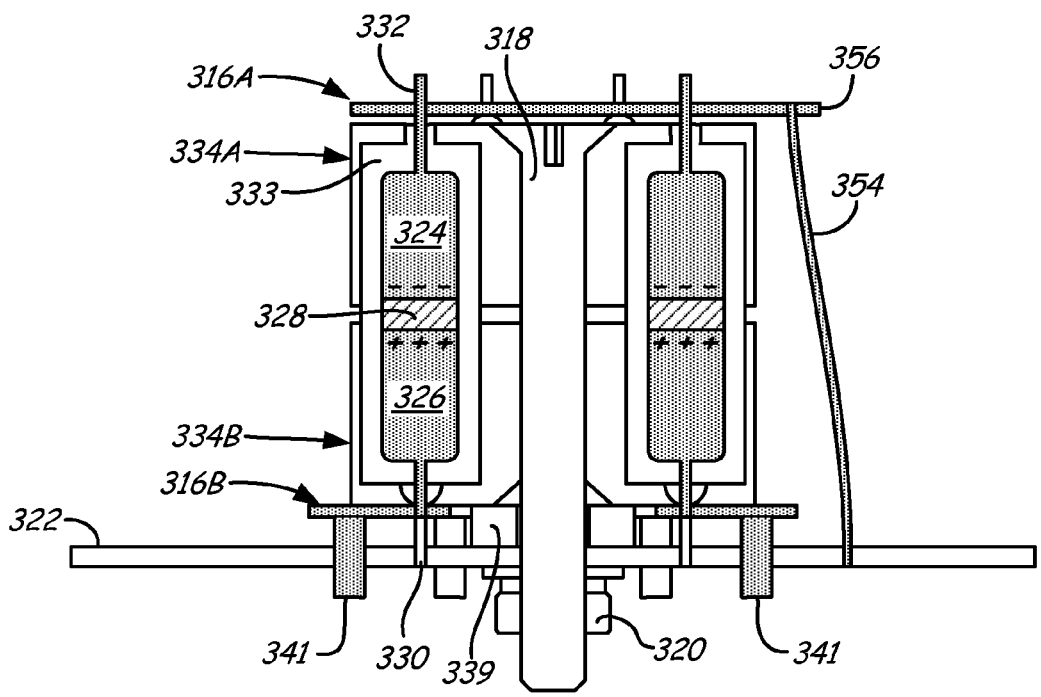
FIG. 3B is a sectional view of the third example capacitor assembly.
Figure 3C:
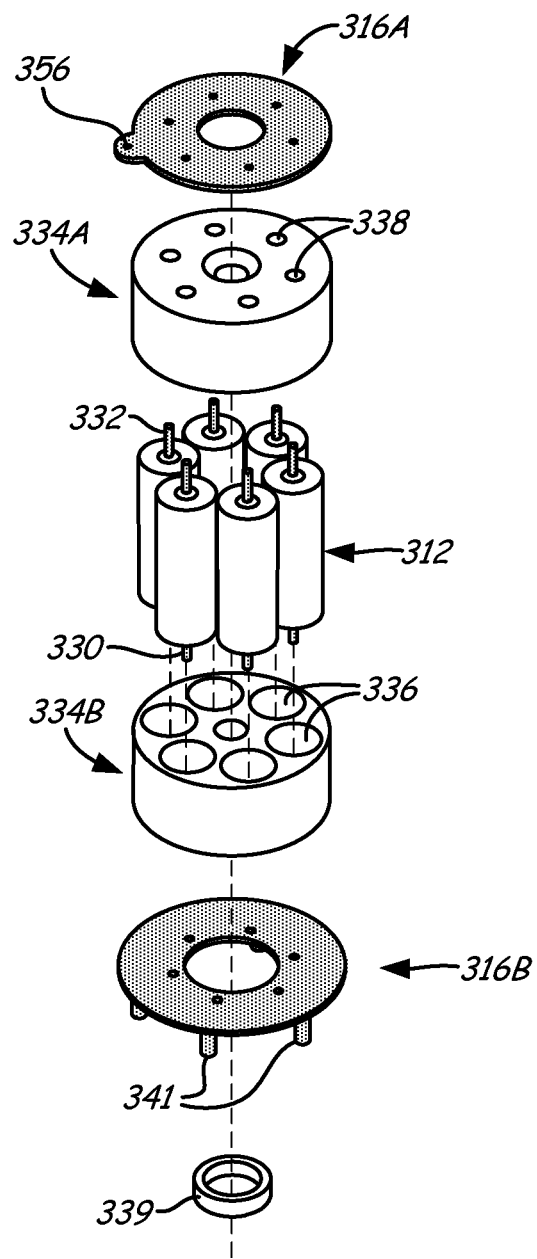
FIG. 3C is an exploded view of the third example capacitor clamping assembly.

FIG. 3B is a sectional view of FIG. 3A showing capacitor assembly 310, capacitor elements 312, clamping assembly 314, upper mounting solder plate 316A, lower mounting solder plate 316B, mounting screw 318, mounting nut 320, PWBA 322, cathode 324, anode 326, dielectric 328, positive lead 330, negative lead 332, upper clamp section 334A, lower clamp section 334B, insulating ring 339, and conductive pins 341. FIG. 3C shows an exploded view of capacitor assembly 310 that also includes recesses 336 and lead pathways 338.

Like other embodiments described above, clamping assembly 314 includes upper and lower clamp sections 334A, 334B for vertically retaining capacitor elements 312. Similarly, upper solder plate 316A is conductive so as to electrically connect negative leads 332. The conductive path through capacitor assembly 310 is completed by connecting anodes 326 to lower solder plate 316B via positive leads 330. Plate 316B includes conductive pins 341 soldered to PWBA 322, which provides most or all of the electrical connection between the circuit(s) on PWBA 322 and anodes 326. Positive leads 330 may or may not also be soldered to PWBA 322, depending on the electrical requirements of the particular circuit(s) for which capacitor assembly 410 is being used. Lower solder plate 316B is electrically isolated from the rest of PWBA 322 by insulating ring 339.

As noted with respect to FIG. 3A, outer lead 354 completes the charge pathway between capacitor elements 312 and PWBA 322, avoiding the need for a center conductor in assembly 314. It should also be noted that, unlike the previous examples, upper and lower clamping sections 334A, 334B do not include inner pins. However, it will be understood that clamping sections 334A, 334B can be readily adapted to include one or more inner or outer pins as seen in FIG. 1A-1D or 2A-2C to axially stiffen capacitor assembly 310. Retention structures other than cylinders can be used with a conductive path and can include either open or closed sides. An example of an open-sided clamping assembly is shown in FIGS. 4A-4C.

Figure 4A:
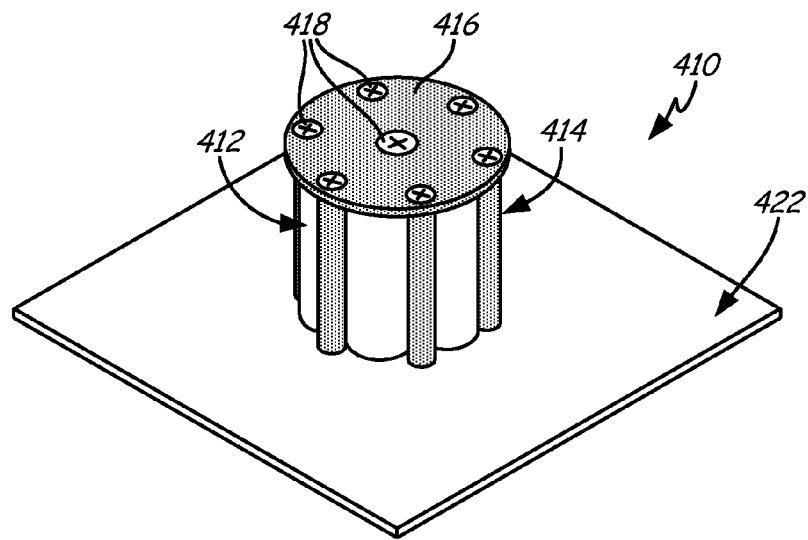
FIG. 4A is an isometric view of a fourth example capacitor assembly with elements mounted perpendicular to a wiring board.

FIG. 4A is a fourth example embodiment of a vertical capacitor assembly. FIG. 4A shows capacitor assembly 410, capacitor elements 412, clamping assembly 414, upper conductive plate 416, upper plate screws 418, and PWBA 422.

Unlike the previous examples, clamping assembly 414 does not fully encapsulate capacitor elements 412 with capacitors open to the environment. And instead of soldering the upper plate to the distal leads, this example shows conductive plate 416 secured directly to clamping assembly 414 by a plurality of screws 418. Thus, in contrast to previous examples, clamping assembly 414 is a single piece and leaves capacitor elements 412 open to the surrounding environment. This may be helpful, for example, when there is sufficient air flow around capacitor assembly 410 to facilitate convection cooling.

Figure 4B:
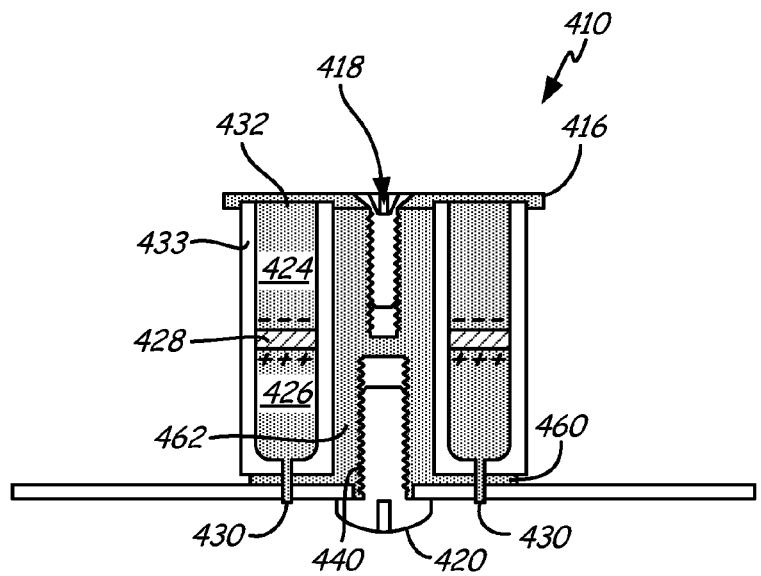
FIG. 4B is a sectional view of the fourth example capacitor assembly.
Figure 4C:
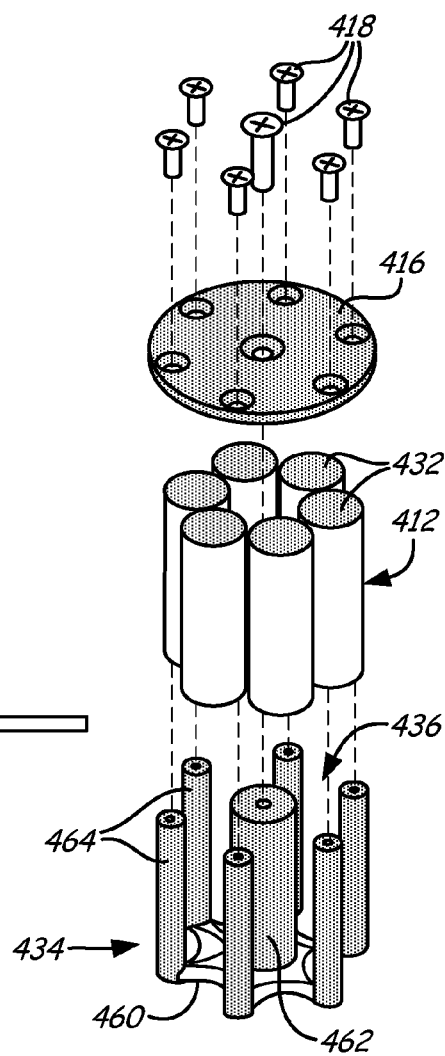
FIG. 4C is an exploded view of the fourth example capacitor clamping assembly.

FIG. 4B is a sectional view of FIG. 4A showing capacitor assembly 410, capacitor elements 412, upper conductive plate 416, conductive plate screws 418, board mounting screw 420, printed wire board assembly (PWBA) 422, cathode 424, anode 426, dielectric 428, positive leads 430, negative terminals 432, clamping structure 434, clamp base 460, and central strut 462.

FIG. 4C is an exploded view showing capacitor assembly 410, capacitor elements 412, clamping assembly 414, upper conductive plate 416, upper plate screws 418, board mounting screw 420, positive leads 430, negative terminals 432, clamping structure 434, capacitor recesses 436, lead pathways 438, base 460, central strut 462, and peripheral struts 464.

FIG. 4B shows one example of the conductive path through clamping assembly 414. FIG. 4C shows how capacitor elements 412 are retained perpendicular to PWBA 422. Capacitor assembly 410 is secured to PWBA 422 by center board mounting screw 420. Clamping assembly 414 includes clamping structure 434 having base 460 with central strut 462 and a circumferentially distributed plurality of peripheral struts 464 projecting perpendicularly therefrom. This combination of base 460 and perpendicular struts 462, 464 defines vertical recesses 436 for vertically retaining capacitor elements 412 perpendicular to PWBA 422.

Conductive plate 416 is directly in contact with negative terminals 432. As compared to leads, terminals 432 engage more surface area at the distal ends of capacitors 412 directly with plate 416. The conductive path for capacitors 412 generally continues through clamping structure 434. Electrical continuity can be provided by at least an electrically conductive portion integrated as at least part of each strut 462, 464. If capacitors 412 are sufficiently isolated with insulators 33, substantially all of struts 462, 464 can form part of the conductive path. Electrical isolation can be provided by portions of base 460 and capacitor insulation 433. Clamping structure 434 can be soldered to PWBA 422 at various points to connect assembly 410 to the circuit. One such group of solder points can be selected directly beneath center strut 462 and peripheral struts 464. Struts 462, 464 can also be threaded for receiving conductive or non-conductive plate screws 418.

Center strut 462 and peripheral struts 464 are arranged in generally a cylindrical orientation. This is in contrast to the outer cylindrical surface as in the previous examples showing a two-piece non-conductive clamp. The single piece clamp shown in FIGS. 4A-4C simplifies assembly of the capacitors and their connection to the mounting surface.

Additionally, leads 430 are shown in this example as projecting straight into PWBA 422. But as described in FIGS. 1A-1C, positive leads 430 can alternatively be bent or folded such that they retain some slack when surrounding elements of capacitor assembly 410 thermally expand and contract. As was previously noted, bending or folding leads 430 can minimize weakening or fracture from torsional and/or vibrational stresses.

While the invention has been described with reference to several exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A capacitor assembly comprising:
   a plurality of capacitor elements;
   a clamping assembly for retaining the plurality of capacitor elements longitudinally perpendicular to a mounting surface; and
   a conductive path for electrically connecting the plurality of capacitor elements to at least one circuit element disposed proximate the adjacent mounting surface;
   wherein the clamping assembly comprises an upper section and a lower section, the upper and lower sections together defining a cylinder with a plurality of recesses disposed circumferentially around an interior of the clamping assembly; and
   wherein the clamping assembly includes a central conductive path.

2. The capacitor assembly of claim 1, wherein the plurality of capacitor elements is a plurality of axial-lead capacitor elements retained by the clamping assembly such that a first lead projects from the capacitor assembly generally toward the mounting surface.

3. The capacitor assembly of claim 2, wherein the plurality of first leads are bent to accommodate thermal expansion of the capacitor assembly.

4. The capacitor assembly of claim 2, further comprising a lower solder plate for electrically connecting the respective first lead of each of the plurality of capacitor elements.

5. The capacitor assembly of claim 1, further comprising an upper solder plate for electrically connecting a respective second lead of each of the plurality of capacitor elements.

6. The capacitor assembly of claim 5, wherein the upper solder plate includes a radial recessed portion proximate a center of the plate.

7. The capacitor assembly of claim 1, wherein the adjacent mounting surface is a surface of a printed wire board assembly (PWBA).

8. The capacitor assembly of claim 1, wherein an anode section of the plurality of capacitor elements comprises tantalum metal.

9. The capacitor assembly of claim 8, wherein a dielectric section of the plurality of capacitor elements comprises tantalum oxide formed on the tantalum anode.

10. A capacitor clamping assembly comprising:
    an upper electrically insulating section;
    a lower electrically insulating section, a combination of the upper section and the lower section defining a cylinder having a plurality of internal recesses disposed circumferentially around the cylinder for retaining a corresponding plurality of capacitor elements longitudinally perpendicular to a mounting surface;

a conductive path for electrically connecting the plurality of capacitor elements to at least one electrical circuit element disposed proximate the mounting surface; and a central conductive sleeve disposed through the upper and lower electrically insulating sections and defining a portion of the conductive path.

11. The capacitor clamping assembly of claim 10, wherein one or more mounting pins project axially from at least one of the upper section and the lower section, the one or more mounting pins providing axial stiffness to the clamping assembly.

12. The capacitor clamping assembly of claim 10, further comprising an electrically conductive upper solder plate.

13. The capacitor clamping assembly of claim 12, further comprising an electrically conductive lower solder plate.

14. The capacitor clamping assembly of claim 13, wherein the lower solder plate includes a plurality of electrically conductive mounting pins.

* * * * *